United States Patent
Beier et al.

(10) Patent No.: US 9,715,666 B2
(45) Date of Patent: Jul. 25, 2017

(54) SUPPLY CHAIN MANAGEMENT USING MOBILE DEVICES

(75) Inventors: Steve Beier, San Jose, CA (US); Varun Bhagwan, Los Gatos, CA (US); James Funk, San Jose, CA (US); Arthur F. Kaufmann, Culver City, CA (US); Suzanna Khatchatrian, San Jose, CA (US); Timothy T. Liu, Berkeley, CA (US); Justin Ormont, Beaver Dam, WI (US); Heather M. Underwood, Seattle, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1576 days.

(21) Appl. No.: 12/827,894

(22) Filed: Jun. 30, 2010

(65) Prior Publication Data

US 2012/0005105 A1  Jan. 5, 2012

(51) Int. Cl.
*G06Q 10/00* (2012.01)
*G06Q 10/06* (2012.01)
*G06Q 30/00* (2012.01)

(52) U.S. Cl.
CPC .......... *G06Q 10/06* (2013.01); *G06Q 30/014* (2013.01)

(58) Field of Classification Search
USPC ....................................................... 705/303
See application file for complete search history.

(56) References Cited

U.S. PATENT DOCUMENTS

| | | | |
|---|---|---|---|
| 5,478,990 A * | 12/1995 | Montanari et al. | 235/375 |
| 6,442,276 B1 * | 8/2002 | Doljack | 380/51 |
| 6,974,078 B1 | 12/2005 | Simon | |
| 7,044,380 B2 | 5/2006 | Knehr-McLaren et al. | |
| 7,172,124 B2 * | 2/2007 | Wang et al. | 235/462.16 |
| 7,263,515 B1 * | 8/2007 | Tenorio et al. | |
| 7,347,373 B2 | 3/2008 | Singh | |
| 7,617,132 B2 | 11/2009 | Reade et al. | |
| 2001/0056359 A1 | 12/2001 | Abreu | |
| 2002/0116260 A1 * | 8/2002 | Szabo et al. | 705/14 |
| 2003/0004750 A1 * | 1/2003 | Teraoka et al. | 705/1 |
| 2003/0229678 A1 * | 12/2003 | Wen et al. | 709/217 |
| 2005/0284932 A1 * | 12/2005 | Sukeda et al. | 235/383 |

(Continued)

FOREIGN PATENT DOCUMENTS

WO   2010018464 A2   2/2010

OTHER PUBLICATIONS

"Smartphone Scanning Big Break for Food Safety", by Helena Bottemiller, Sep. 1, 2009 (3 pages).*

(Continued)

*Primary Examiner* — Kira Nguyen
(74) *Attorney, Agent, or Firm* — Steven L. Nichols; Fabian VanCott

(57) ABSTRACT

A method for supply chain management using mobile devices with a server on an electronic data network includes receiving identifying information for a product transmitted from a mobile device via the network, the server being periodically updated with product recall data. The server queries a traceability server via the network for master data and event data related to the product using the identifying information. The server processes the recall data, master data, and event data to produce product data which is output to the mobile device.

2 Claims, 10 Drawing Sheets

(56) References Cited

U.S. PATENT DOCUMENTS

| | | |
|---|---|---|
| 2006/0031148 A1* | 2/2006 | O'Dell et al. .................. 705/28 |
| 2007/0005265 A1* | 1/2007 | Sakurai et al. ................. 702/22 |
| 2007/0118388 A1 | 5/2007 | Hamilton et al. |
| 2008/0086387 A1* | 4/2008 | O'Rourke et al. .............. 705/27 |
| 2008/0116276 A1* | 5/2008 | Lo ............................ 235/462.01 |
| 2008/0238610 A1* | 10/2008 | Rosenberg .................... 340/5.7 |
| 2008/0263011 A1 | 10/2008 | Badinelli |
| 2008/0305827 A1* | 12/2008 | Barnes .................. G06Q 30/02 455/556.1 |
| 2009/0061929 A1* | 3/2009 | Evans ........................ 455/556.1 |
| 2009/0160646 A1* | 6/2009 | Mackenzie et al. ....... 340/572.1 |
| 2009/0170483 A1 | 7/2009 | Barnett et al. |
| 2010/0036755 A1* | 2/2010 | Saghbini ....................... 705/28 |
| 2010/0262521 A1* | 10/2010 | Robinson et al. .............. 705/29 |
| 2010/0280963 A1* | 11/2010 | Fordyce, III ......... G06Q 30/014 705/303 |
| 2011/0082747 A1* | 4/2011 | Khan et al. ................ 705/14.58 |

OTHER PUBLICATIONS http://www.agorasys.com/products.html (From archive Jun. 2009, 1 page).*

"Product recalls soon to be listed at checkout", Dana Flavelle, Wed Nov. 4, 2009, 3 pages.*

\* cited by examiner

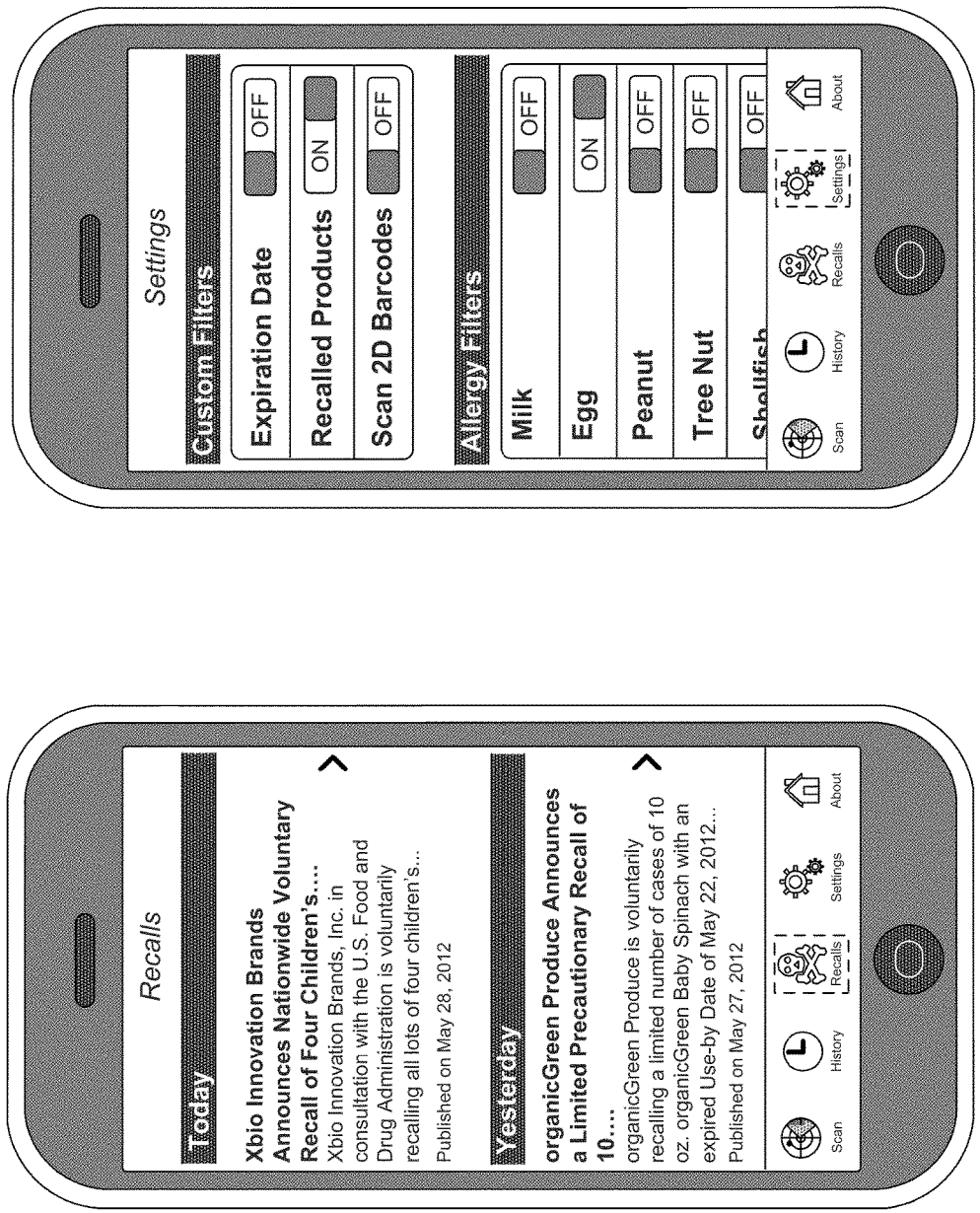

Xbio Innovation Brands Announces Nationwide Voluntary Recall Of Four PediaCare Children's Products

FOR IMMEDIATE RELEASE — May 28, 2012 — Tarrytown, NY – Xbio Innovation Brands, Inc., in consultation with the U.S. Food and Drug Administration, is voluntarily recalling all lots of four children's products in the PediaCare line. The four PediaCare items involved in the recall are:

1. PediaCare Multi-Symptom Cold 4oz., UPC #3 0045-0556-05 9
2. PediaCare Long Acting Cough 4oz. UPC# 3 0045-0465-04 7
3. PediaCare Decongestant 4oz. UPC# 3 0045-0554-04 8
4. PediaCare Allergy and Cold 4oz. UPC# 3 0045-0552-04 4

While the recall was not initiated as a result of either any consumer reports of adverse events or complaints with respect to the PediaCare products, tiny particles have been found in other non-PediaCare products which were manufactured at the McBeil plant.

While the potential for serious medical events is remote, the company advises consumers who have purchased these recalled products to discontinue use. Xbio Innovation Brands is asking Retail and Wholesale customers to withdraw the four products from their shelves and warehouses and return the product to Xbio Innovation Brands.

Consumers with questions may contact Xbio Innovation Brands on Friday, May 28th 5pm – 9pm EST; Saturday-Monday 9am-5pm EST; and normal business hours thereafter at (888) 444-9999. More information is available at xbioinnovation.com

- Manufacturer Name (305)
- Product Name (310)
- Consumer Action (315)
- Contact Telephone Number (320)
- Recall Date (325)
- Product UPC Number (330)
- Retail Action (335)
- Internet Address (340)

SUPPLY CHAIN MANAGEMENT USING MOBILE DEVICES

BACKGROUND

Supply chain management extends from the acquisition of raw materials, through the manufacturing and distribution process, and typically ends at the point of consumption. In many instances, supply chain management is a disjointed process in which a particular manufacturer or distributor tracks portions of the supply chain, but may not incorporate individually serialized product records or pass the existing records to the next portion of the supply chain. In particular, oversight groups and end consumers may not have access to, or an opportunity to contribute to, the supply chain data.

Shortcomings of the supply chain management are particularly apparent when food, medical products, or other consumer goods are recalled due to health or safety issues. The end consumer does not have an easy way to monitor the Food and Drug Administration (FDA) or United States Department of Agriculture (USDA) websites for recall information or to determine if the product they are purchasing or consuming has been recalled. Because the supply chain data is often not complete or accessible, the proportion of products which are successfully recalled can be low.

BRIEF SUMMARY

A method for supply chain management using mobile devices with a server on an electronic data network includes receiving identifying information for a product transmitted from a mobile device via the network, the server being periodically updated with product recall data. A server queries a traceability server via the network for master data and event data related to the product using the identifying information. The server processes the recall data, master data, and event data to produce product data which is output to the mobile device.

A system for supply chain management using mobile devices includes a server configured to receive product identifying information and run cron jobs to periodically retrieve recall information from oversight agencies. An electronic data network connects a mobile device to the server. A traceability server contains master data and event data for the product. The server retrieves master data and event data from a traceability server, processes the master data, event date, and recall information to produce product information, and outputs the product information to the mobile device.

A computer program product for supply chain management using mobile devices includes a computer readable program code configured to receive product identifying information transmitted from mobile device via a network. The computer readable program code also updates a database with product recall data and queries a traceability server for master data and event data related to the product using the product indentifying information. The computer readable program code processes the recall data, master data, and event data to produce product data and outputs at least a portion the product data to the mobile device.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIGS. 3A-3I are illustrative screen shots of a mobile device which is configured to read barcodes and access external servers to present supply chain data to an user, according to one embodiment of principles described herein.

FIGS. 5A-5F are illustrative screen shots of a mobile device which is configured to verify a shipment, according to one embodiment of principles described herein.

Throughout the drawings, identical reference numbers designate similar, but not necessarily identical, elements.

DETAILED DESCRIPTION

Figure 1:
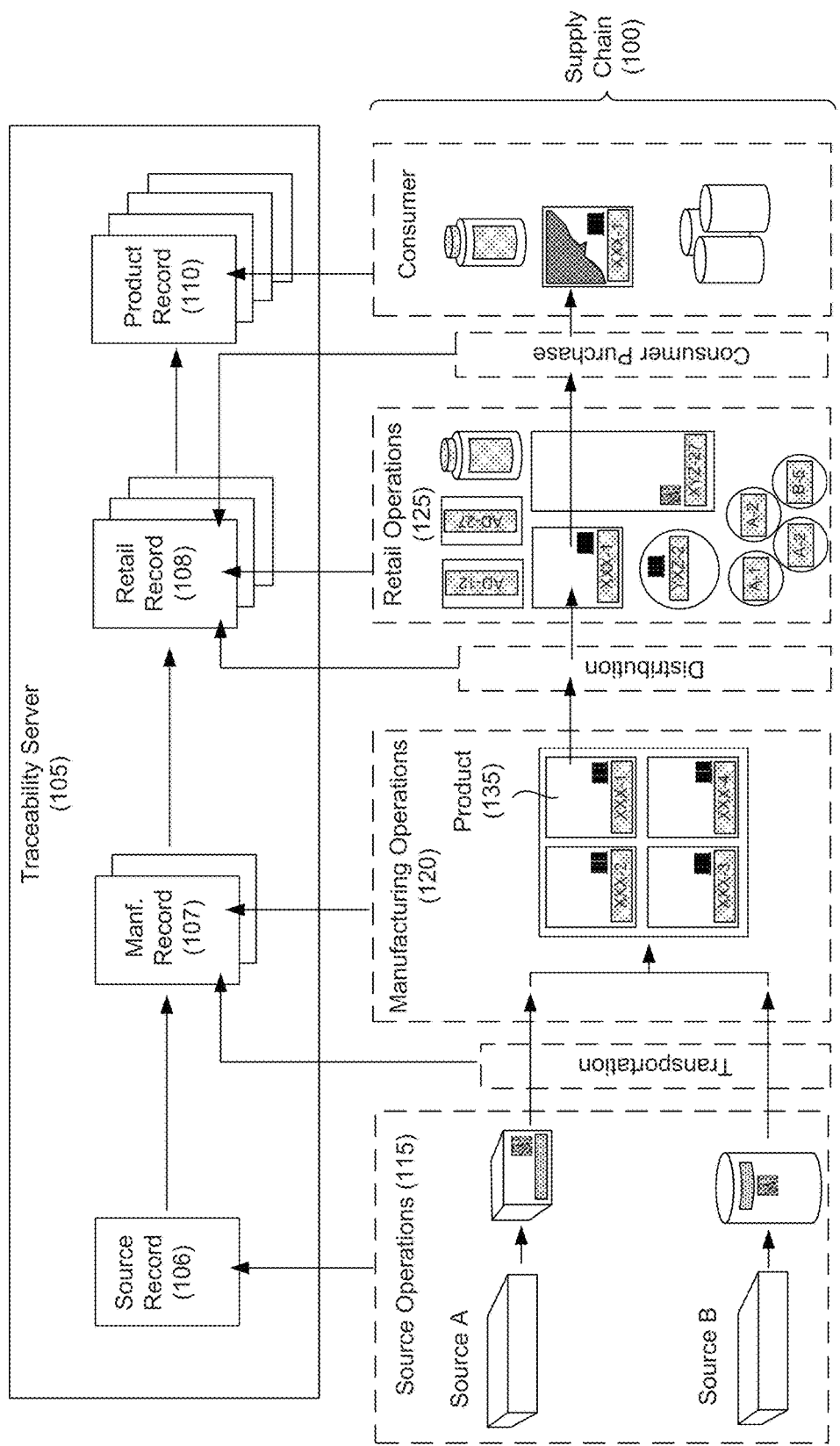
FIG. 1 is a diagram of an illustrative supply chain which accumulates records within a traceability server, according to one embodiment of principles described herein.

As discussed above, supply chain management extends from the acquisition of raw materials, through the manufacturing and distribution process, and typically ends at the point of consumption. In many instances, supply chain management is a disjointed process in which a particular manufacturer or distributor tracks portions of the supply chain, but may not incorporate individually serialized product records or pass the existing records to the next portion of the supply chain. In particular, oversight groups and end consumers may not have access to, or an opportunity to contribute to, the supply chain data.

Shortcomings of the supply chain management are particularly apparent when food, medical products, or other consumer goods are recalled due to health or safety issues. The end consumer does not have an easy way to monitor the FDA or USDA websites for recall information or to determine if the product they are purchasing or consuming has been recalled. Because supply chain data is often not complete or accessible, the proportion of products which are successfully recalled can be low.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a diagram of an illustrative supply chain (100) which accumulates product records (110) within a traceability server (105). A supply chain (100) typically extends from the acquisition of raw materials, through the manufacturing and distribution process, and ends at the point of consumption. In some fields, an effort has been made to extend the chain through the entire life cycle of the product, including recycling or disposing of the waste products generated throughout the chain. Information generated throughout the supply chain (100) can be used to improve productivity, efficiency, product safety, and other elements of the supply chain and the products it produces.

However, the process of gathering, storing, and analyzing supply chain records is typically a disjointed process in which a particular manufacturer or distributor tracks portions of the supply chain, but does not pass the existing records through the entire supply chain or make the information available throughout the life of the product. A traceability server (105) is an information sharing platform that provides a standards based repository for data generated in a supply chain. The traceability server captures and manages both master data and event data. Master data is related to people, places, and products and event data is related to actions such as shipping, mixing, joining, and refrigerating. For example, master data may include a list the ingredients in a food product, the origins of the ingredients, and the people who produced, transported, or manufactured the ingredients. The event data may include shipping information of the ingredients, the method used to combine the ingredients, and storage information for the completed food product. One example of a traceability server is the IBM InfoSphere Traceability server. The use of a traceability server (105) can improve records kept throughout the supply chain and provide controlled access to the records as needed.

The supply chain example shown in FIG. 1 has been simplified for purposes of illustration. Most supply chains have more components and operations than are illustrated in FIG. 1. Source operations (115) create or extract raw materials from various sources. For example, a mineral may be extracted from a mine, a farm may produce a crop, or a chemical supplier may refine a chemical. These raw materials are packaged in bulk containers and transported to manufacturing operations (120). There is a variety of information which can be sent to the Traceability Server (105) in the source record (106). For example, the source record (106) may include the country and location where the raw materials were produced, the date of extraction/synthesis/harvest, the batch or lot number, assay information, the container number, the shipping date, the persons involved in the productions, etc. For farms, the source record (106) may include seed information, pesticide and herbicide application, harvesting dates, inspection information, etc.

The manufacturing operations (120) may also contribute a manufacturing record (107) to the traceability server data. The manufacturing record (107) may include transportation information from the source operations to the manufacture. The transportation information may include data such as the shipping company, the mode of shipment, shipping dates, temperatures, locations, distances, persons involved in the transportation, etc.

After receipt of the raw materials, the manufacturing operations (120) may perform a variety of actions to produce a product. For example, the manufacturing operations (120) may join, shape, or mix various raw materials to form a product. During the manufacturing process, the manufacturer may access the source record (106) and generate a manufacturer record (107). The manufacturer record (107)

may include the product name, type, ingredients (referenced to the source data), item size, product picture, lot numbers, individual serialized product numbers, expiration dates, manufacturing processes, persons responsible for the various steps in manufacturing the product, and other information. The end result of the manufacturing process is the creation of individual products which are ready for consumption. In some circumstances, the individual products may not be individually identifiable. Rather, an entire lot of the product may be labeled with the same lot number. In some circumstances, the lot number may be encoded in a Universal Product Code (UPC) symbol which is placed on the product or the packaging which contains the product. UPC symbols are machine readable graphics which contain information (typically a lot or serial number) which allows the product or lot to be identified.

The product (135) is then passed through distribution channels to retail operations (125). The retailer typically stocks a large number of products which are available for purchase by a consumer. The serial or lot identifiers on the products assist the retailer in inventorying, advertising, and selling the individual products. The retail operations (125) may also produce a retail record (108) which is added to the traceability server (105). This retail record (108) may include distribution information which is similar to the transportation information described above. The retail record (108) may include pricing information, advertising information, consumer purchase data, inventory levels, storage parameters, and other data.

The individual serialization of products can have a number of benefits, including the identification of counterfeit mislabeled products. For example, at the bottom of the retail operations box (125), there are four individually serialized products represented by small circles labeled with serial numbers ("A-1," "A-2," "A-2," and "B-5"). If the products are individually serialized, the retailer or consumer can determine that two of the products have the same serial number. This is an irregularity which may indicate that one or more of the products may be counterfeit. Additionally, after entering the individually serialized number "B-5," the retailer or consumer can access the traceability records (105) and determine that a record for this number does not exist or that the record does not match the product. Consequently, the retailer or consumer can make the determination that the product has been mislabeled. A variety of other information can be ascertained by using the serial numbers and traceability server data. For example, if the product is not in the location where it was originally sent, the product may be bootlegged or otherwise illegitimate.

The consumer then purchases the product (135) from the retailer. This transaction information could also be included in the retail record (108). The consumer then consumes or eventually disposes of the product. In some situations, the consumer may also contribute information to the records. For example, the consumer may scan a bottle of pain relievers which are in their home. When the bottle is scanned, the date and location of the bottle could be noted by the traceability server (105). The traceability server (105) could then send the consumer automatic notification of recalls or the expiration of the product.

Figure 2:
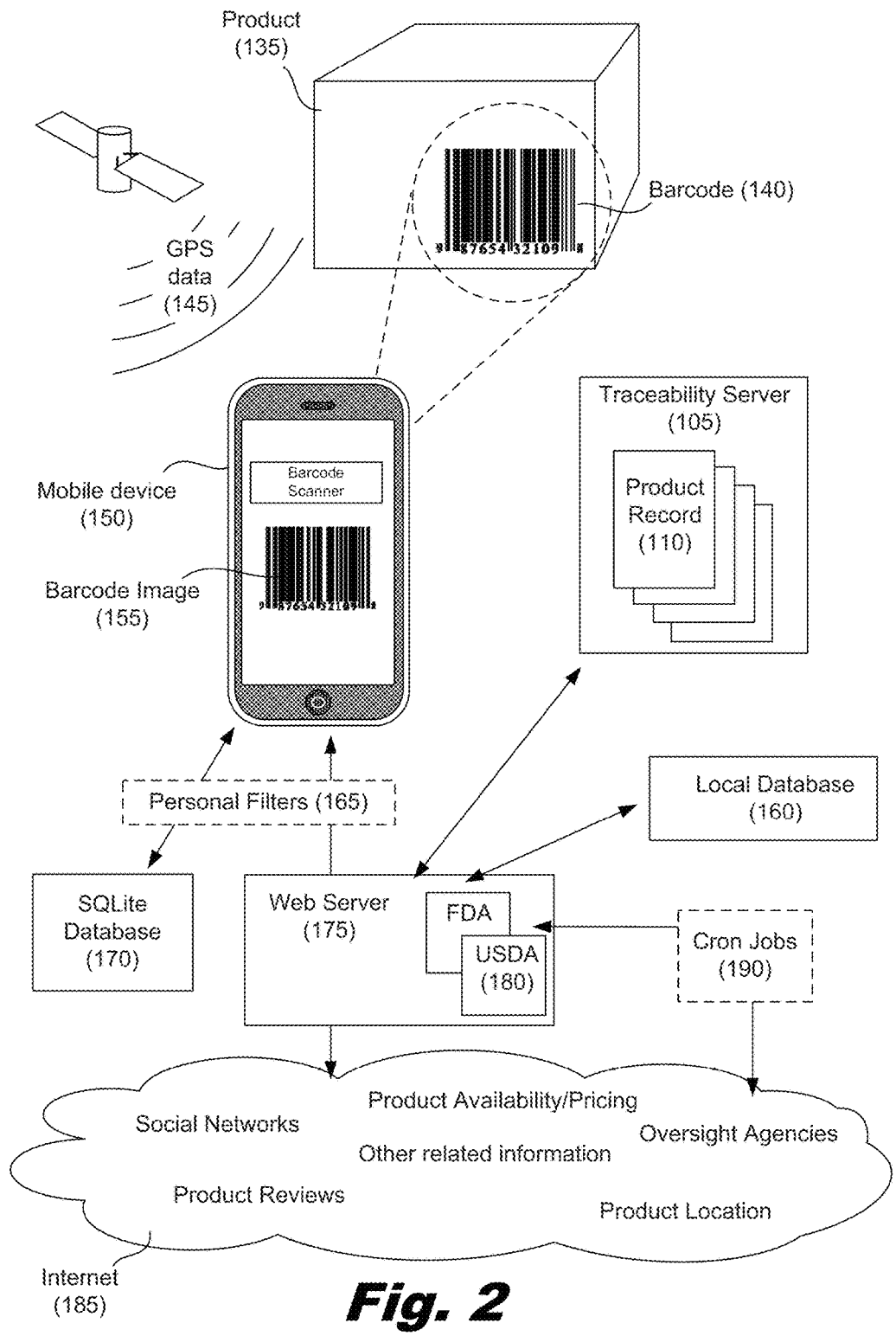
FIG. 2 is a diagram of an illustrative mobile device which is used to access and contribute to supply chain management, according to one embodiment of principles described herein.

FIG. 2 is a diagram of an illustrative mobile device (150) which is used to access and contribute to supply chain management data. Mobile devices (150) are becoming ubiquitous in modern society and are becoming more interconnected and capable. For example, many mobile devices (150) include a color camera and interconnectivity to cellular and wireless networks. The mobile devices (150) could be used to acquire identifying information from products in a variety of ways. For example, the mobile device (150) may take a picture of a barcode, a picture of the product, using a radio frequency identification (RFID) scanner, or used in conjunction with a handheld wand or laser scanner. As used in the specification and appended claims, the term "identifying information" refers to any information which allows for the product or product lot to be identified. Throughout the specification, the acquisition of a barcode image using a camera in the mobile phone is used as an illustrative example of acquiring identifying information from products. This barcode image could be in color or in black and white. U.S. patent application Ser. No. 12/828,051, now U.S. Pat. No. 8,505,823, entitled "Noise Removal from Color Barcode Images," to Justin Ormont et al., describes various methods for using a mobile device camera to recognize barcodes and is incorporated by reference herein in its entirety. The mobile device (150) generates a barcode image (155) which is then analyzed to decode the product barcode (140) and produce the barcode data.

After successfully decoding the product barcode (140), the barcode data can be used by the mobile device (150) to access various databases to obtain information about the product (135). In the example shown in FIG. 2, the mobile device (150) may access an SQLite database (170) and a web server (175) using SQL protocols. The SQLite database (170) may include a product history, product information, and a UPC code database. The UPC code database can be searched using the barcode data to identify the product (135). After the product (135) is identified, the product history and product information can be accessed.

The web server (175) may be accessed by the mobile device (150) using eXtensible Markup Language (XML), HyperText Transfer Protocol (HTTP), HyperText Transfer Protocol Secure (HTTPS) or other protocols. The web server (175) may run Apache, Django, MySQL or other software. The web server (175) may facilitate a variety of internet searches. The user may directly indicate which searches are desired, or the web server (175) may automatically search various sites to keep an up-to-date repository of information. According to one illustrative embodiment, a server may register to receive automatic updates of recall information from the USDA and FDA organizations through email, text messaging, or other techniques. This recall information may include updates of old recalls and also notices of newly released recalls. As soon as a new email is received, it can be processed.

Throughout the specification, the USDA and FDA organizations are used as illustrative oversight organizations. The oversight organizations are not limited to the USDA and FDA organizations, but may include international organizations, consumer watch dog organizations, and other organizations. For example, these organizations may include the European Medicines Agency (EU), Medicines and Healthcare products Regulatory Agency (UK), Therapeutic Goods Administration (Australia), Sanitary Surveillance Agency (Brazil), State Food and Drug Administration (China), and other organizations. Including recall and product warning data from international organizations can increase the robustness of the database and provide more reliable warnings for both domestic and international users.

Another technique to reduce the time required to make recall data available to users is to use automated retrieval methods. For example, the web server (175) may use various cron jobs (190) to regularly access the web sites of oversight agencies or media outlets to search for FDA and USDA recall information. Cron jobs (190) are time-base job schedulers which enable the various commands or shell scripts to be run periodically. Cron jobs (190) can be used to automate the access and retrieval of the recall information in a timely manner without continued attention by a human operator. This recall information can be stored on the web server as FDA and USDA recall records (180) for rapid access by the mobile device (150). In some embodiments, the FDA and USDA recall records (180) may be stored on a separate database, such as local database (160), which is accessible to the web server (175). Additionally or alternatively, the recall information may be pushed to the mobile device (150) based on user preferences or items that the user has purchased.

Social networking can also be used to acquire recall information. For example, a user may distribute a message to their social network which says "I just saw that product X was recalled & I'm glad I scanned product Y before buying it, because the FDA has recalled it due to salmonella contamination See: http://www.fda.gov/Safety/Recalls/ucm014996.htm". This could directly notify the individuals in the social network of the recalls. Additionally or alternatively, the message could be parsed by an algorithm and added to a recall database. For example, mobile devices may subscribe to a Twitter feed which pushes, recall information to the mobile devices.

Additionally, the history of products scanned or purchased by the user could be stored on the mobile device or server. If a user has previously scanned or purchased what is now a recalled product, the user is notified through the use of a push notification of the recall. For example, the recall notice could be implemented as a popup on the mobile device which identifies the product previously scanned, the time/location the product was scanned, and recall information. Other techniques for communicating the recall could be badges next to the application icon, notification next time the user starts the application, text messages, email, or other techniques.

The web server (175) may also support web searches using the barcode data, product description, or other data. These web searches may be automated or manually entered. For example, the user may have a favorite product review site. The user may configure the mobile device (150) to request a search of the product review site anytime the mobile device (150) is used to scan a barcode (140). Other internet searches may include accessing competitor's websites or advertising to determine alternative sources and pricing of the product (135). The location of the product (135) or store may also be of interest to the user. In some embodiments, the user may wish to access social networks to report on purchases or to determine the popularity of a given product with peers. A variety of other information may also be accessed over the internet (185). For example, when a food product is scanned, a recipe database may be accessed to provide cooking or serving suggestions. The recipe database may also create shopping lists for selected recipes to ensure that the user has the ingredients to complete a selected recipe.

The web server (175) may also access other servers, such as the traceability server (105) or a local database (160). As discussed above the traceability server (105) contains the product records (110) for the scanned product (135). The web server (175) may access the traceability server (105) using a variety of protocols, including SQL. The web server (175) provides the barcode data and the traceability server (105) may return data from the product records (110). For example, the traceability server (105) may return the location history of the product (135), any recall information associated with the product, related recalls, refrigeration information, ingredients, lots/batches, company/manufacturer information, expiration data, and other information. The local database (160) may include information such as the product name, product type, ingredients, nutrition facts, company/manufacture information, item size, credence attributes, a product picture, and other information.

Additionally, the mobile device (150) itself may store some information. For example, the mobile device (150) may store a history of barcodes which were scanned by the user, user preferences, and a personal filter (165) which selectively filters the data from various outside devices. The mobile device (150) may also receive inputs from other devices, such as GPS data (145) or cell network data which allows the mobile device (150) to determine its location, and consequently, the location of the item it is scanning. As discussed above, this location data can be used to determine if the product (135) is in an unexpected location which may indicate that the product (135) was stolen, counterfeit, lost, or bootlegged. Additionally, the location information received by the mobile device (150) may be used to provide mapping to assist the user in locating a desired product.

The components and systems described above are only one illustrative example of systems which can be used for supply chain management. A variety of other configurations could be used. For example, a mobile device (150) may access more or fewer servers than illustrated. In one embodiment, the entire external architecture may be virtualized using cloud computing.

FIGS. 3A-3I, 4A-4C, and 5A-5F show the operation of a mobile device within the illustrative systems described above. FIGS. 3A-3I are illustrative screen shots of a mobile device which is configured to read barcodes and access remote databases to present product data to a user. According to one illustrative embodiment, the user starts the application and is taken to the view with a number of icons present at the bottom of the view, including scan, history, recalls, settings, and about icons. FIGS. 3A-3I sequentially describe the functions associated with each of these icons.

Figure 3C:
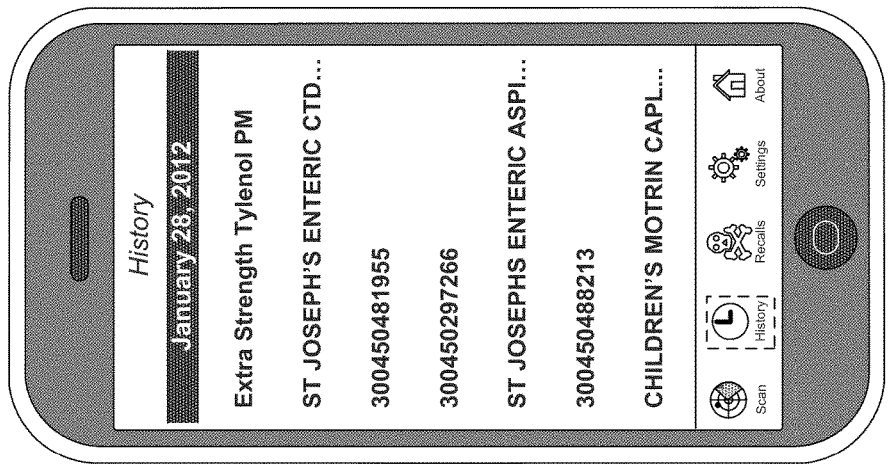
Figure 3B:
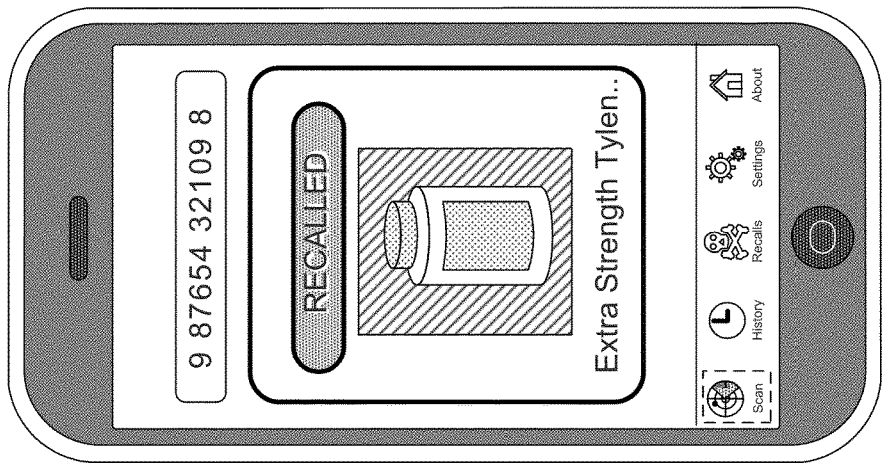
Figure 3A:
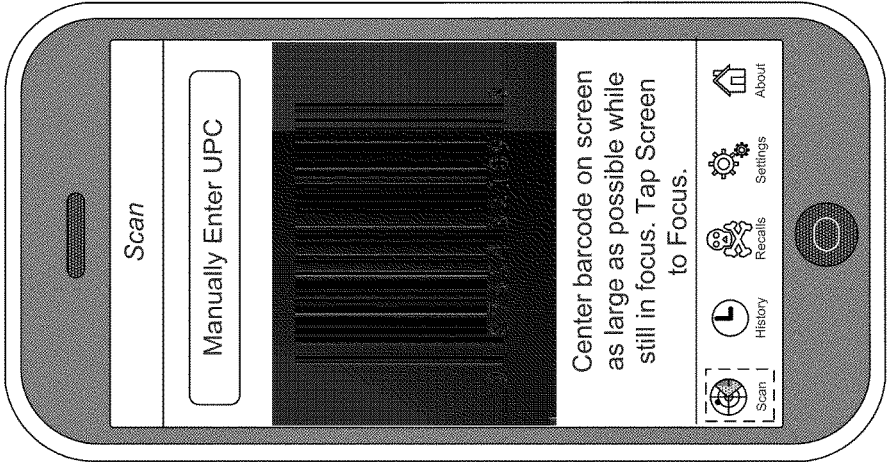

FIG. 3A is the scanning view and has the "scan" icon selected as shown by the dashed box which surrounds the scan icon. The scanning view instructs the user to center the barcode on the screen as large as possible while the camera is still in focus. The user can tap the screen to focus the camera. The camera on the mobile device may stream a series of pictures or a single picture to the barcode recognition software. As soon as the software decodes the barcode, the barcode data is displayed. If there are problems with decoding the barcode, the user can manually enter the barcode data by selecting the text entry field at the top of the scanning view. In some embodiments, when the text entry field is selected, a visual prompt guides the user to enter the correct information from the product packaging. For example, a picture of a barcode could appear with the numbers below the vertical bars highlighted. This visually prompts the user to enter the corresponding numbers from the product.

When the product identifying information is successfully scanned or entered, the mobile device may respond with an audible cue. For example, the normal audible cue may be a register beep sound, while a warning audible cue (such as a flat thud) may be generated for a product that has been recalled, has an ingredient to which the user has an allergy, or other problem.

In some embodiments, the application may automatically display recall warnings when a barcode for a recalled item is scanned. FIG. 3B shows a view with a recall warning. The barcode data is displayed at the top of the view and a picture and description of the recalled product is displayed below. This automatic "flash" notification of the recall can efficiently alert the user of the recall and prevent the user from purchasing or consuming the recalled product. The user can determine if the barcode data has been accurately decoded by comparing the picture and description displayed on the mobile device with the product which was just imaged. If the picture and description do not match the product just imaged, the user can rescan the item or manually enter the barcode number.

A number of other notifications could also be provided after scanning a product. For example, an "Allergen" warning, a "Danger" warning, a "Counterfeit" notification, a "Missing Data" notification, a "No Data/Unknown" notification or other notification could be provided. These and other notifications could be provided in a manner similar to the recall warning illustrated in FIG. 3B. The notifications could also communicate the status of the application. For example, if the application is searching the database for matching information, a "Searching" notification could be displayed.

An illustrative algorithm for displaying notifications is given below.

```
Have NO Recall Database on Mobile Device (web request failed), then
   If ANY Allergies are set, then
      Request Ingredient list (cache or web request) and Wait for Response
      If Have an Ingredient List, compare Allergies to Ingredients
         If Allergens are present in Ingredients display "Allergen" warning
         If no Allergens are present display "Unknown" warning
      If don't have Ingredient List, display "Unknown" warning
   If No Allergies are Set, display nothing or display "Unknown" warning
Have an OLD Recall Database on Mobile Device (DB is cached but
>2 days old)
   If item is recalled, display "Recalled" warning
   If item is NOT recalled then
      If ANY Allergies are Set, then
         Request Ingredient list and Wait for Response
         If Have an Ingredient List, compare Allergies to Ingredients
            If Allergens are present, display "Allergen" warning
            If NO Allergens are present, display "Unknown" warning
         If don't have Ingredient List, display "Unknown" warning
      If NO Allergies are Set, display nothing or display "Unknown"
warning
Have a CURRENT (<2 days old) Recall Database
   If item is recalled, display "Recalled" warning
   If item is NOT recalled then
      If ANY Allergies are Set, then
         Request Ingredient list and Wait for Response
         If Have an Ingredient List, compare Allergies to Ingredients
            If Allergens are present, display "Allergen" warning
            If NO Allergens are present, display "OK"
         If don't have Ingredient List, display "Unknown" warning
      If No Allergies are Set, display "OK" notification
```

The illustrative algorithm above checks only for recalls and allergens. Other algorithms may be used which perform a number of other checks. For example, the algorithms may check for counterfeit products, expiration dates, or other issues.

FIG. 3C is an illustrative screen shot of a history view. To bring up the history view, the user has selected the history icon as indicated by the dashed box which surrounds the history icon. The history view may have a variety of views, including views which list the sequence of scanned items, a list of scanned products which have been recalled, an inventory of items kept in a specific location, a list of food products purchased during a given month, or other list. In FIG. 3C, the history view shows a list of scanned items in the order in which they were scanned.

FIG. 3D is an illustrative screen shot of a recall view which shows details of a number of recalls. Under a "today" heading, the details of a recall of children's medication are described. Under a "yesterday" heading, details of a food recall are given. For more information about a given recall, the user can select the arrow on the right side of the screen. The view will then change to display the complete FDA or USDA recall information.

FIG. 3E is an illustrative screen shot of a settings view which shows a number of filters which can be configured by a user so that only desired and relevant information is displayed by the application. An upper portion of the view includes the settings for expiration date, recalled products, and types of barcodes the mobile device will be used to scan. On the right of each filter description is a slider which can be toggled to activate or deactivate the filter. In this example, the user is not interested in the expiration date of scanned products and has turned the expiration date filter off. The user would like to receive information about recalls of the products which are scanned and has turned this filter on. The user is only scanning 1D barcodes and has turned the 2 D barcode filter off.

The bottom portion of the settings view lists a number of allergy filters including milk, egg, peanut, tree nut, and shellfish allergies. The user is only concerned with egg allergies and has shut off all the other filters. When the user scans a given item, the mobile device decodes the barcode to produce barcode data, which is then used to identify the product and retrieve the ingredient list for the product. If the product contains eggs or was manufactured in a facility which processes eggs or egg products, a warning will be displayed which notifies the user of the potential for eggs to be present in the product. However, if milk, peanuts, tree nuts or shellfish are present and not egg products, no warning will be displayed.

FIG. 3F shows a simplified version of an FDA recall notice. Typically FDA and USDA recall notices are textual notices which are intended to be read and acted upon by humans. The FDA and USDA do not generate recall data suited for incorporation into a database or for direct use in database searches. Consequently, the textual FDA and USDA recalls are not very effective for the automation of recall notices by an application or other computer implemented method.

As discussed above, a cron job may be used to retrieve textual FDA recalls, USDA recalls, company specific recalls, or other recalls. After retrieval, the textual information is processed to extract information from the text and populate a recall database. If the recall is not in a machine readable format, optical character recognition can be used to generate editable text. The editable text is then parsed and identified. FIG. 3F shows a number text segments which were parsed and identified. The text segments can then be analyzed and the relevant information deposited in a database for later recall or modification. In FIG. 3F, the manufacture name (305), product name (310), desired consumer action (315), recall date (325), product serial number (330), desired retail action (335) and contact information (320, 340) have been extracted from the FDA textual recall announcement. This information is stored in a database and compared to barcode data which is entered by a user. If a match between the barcode and the recalled products is produced, the user is flash notified that the product has been recalled.

Figure 3I:
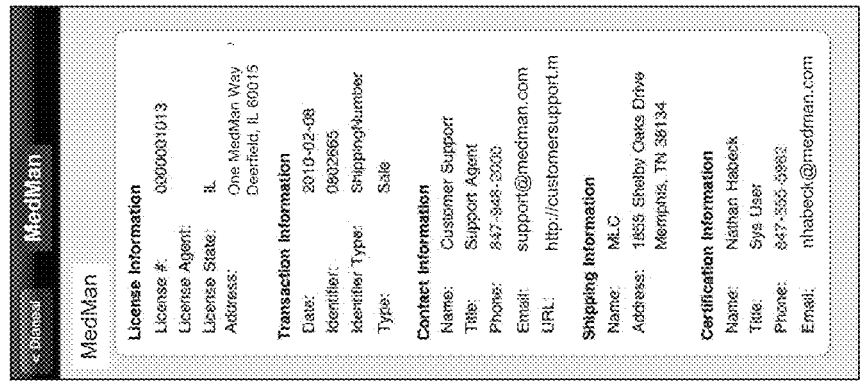
Figure 3H:
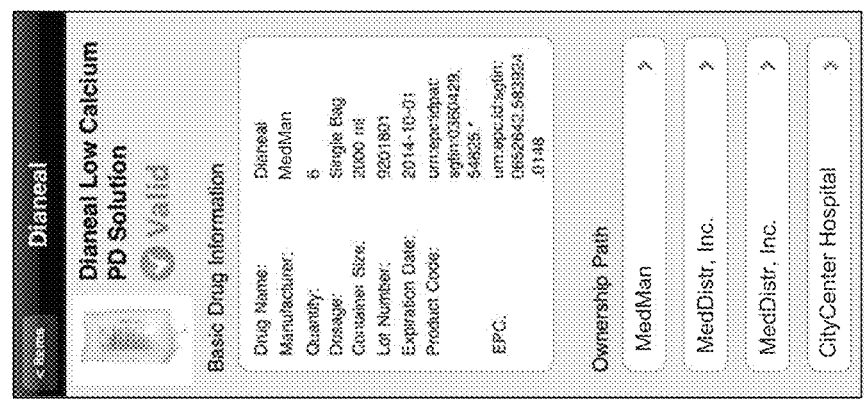
Figure 3G:
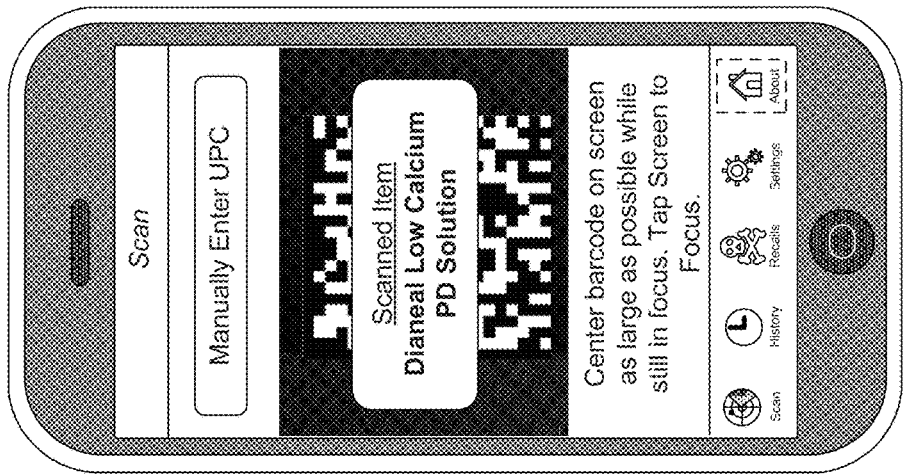

FIGS. 3G-3I are illustrative screen shots which show the use of the "about" view to verify product authenticity. In FIG. 3G, the user has selected the "about" icon as indicated by the dashed box around the "about" icon. The about view directs the user to scan a barcode. In this case, the user has scanned a two dimensional barcode. The application decodes the barcode, uses the barcode data to access a barcode database, matches the barcode data to an entry in the barcode database, and displays information in the matching entry to the user. In this case, the user has scanned a barcode of "Dianeal Low Calcium PD Solution." Additionally or alternatively, the user can select a previously scanned item from a history, or can manually enter the barcode information.

FIG. 3H is an illustrative screen shot which provides more detailed information about the product, including the results of a validity check. According to one illustrative embodiment, the validity check is performed by querying the traceability server (105, FIG. 2) for the product information. The traceability server returns the image and name at the top of the screen. The traceability server also checks the authenticity of product and notifies the user of the result. The authenticity check can be made in a number of ways, including verification that the product barcode data is validly issued from a reputable manufacturer, verifying that there have not been duplicate barcode data submitted (for individually serialized products), verifying that the shipping history is valid and the end destination of product is in close proximity to the scanning location, verifying that credentials of organizations and individuals in the supply chain, and other actions. In this example, the process has determined that the product is valid and displays a "Valid" notification.

Below the valid notification, details about the product are displayed. In this example, information about the drug name, manufacturer, quantity, dosage, size, lot number, expiration data, and product codes are display. At the bottom of the page, the chain of custody for the product is displayed. In this example, the manufacturer, "MedMan," is listed at the top of the custody chain, with the distributor, "MedDistr, Inc.," listed twice in the center of the custody chain, and the end user, "CityCenter Hospital," listed on the bottom. If the user wants additional information about any of the entities in the custody chain, the user can select the arrow to the right of the custody entry for more information.

In this example, the user has selected the arrow to the right of the "MedMan" entry of the custody chain. This brings up the screen shot shown in FIG. 3I. In this screen shot, the license and contact information for this entity is shown. Information about the transaction type and shipping information is also available. Certification information for a person responsible for the product at "MedMan" is also given.

Figure 4C:
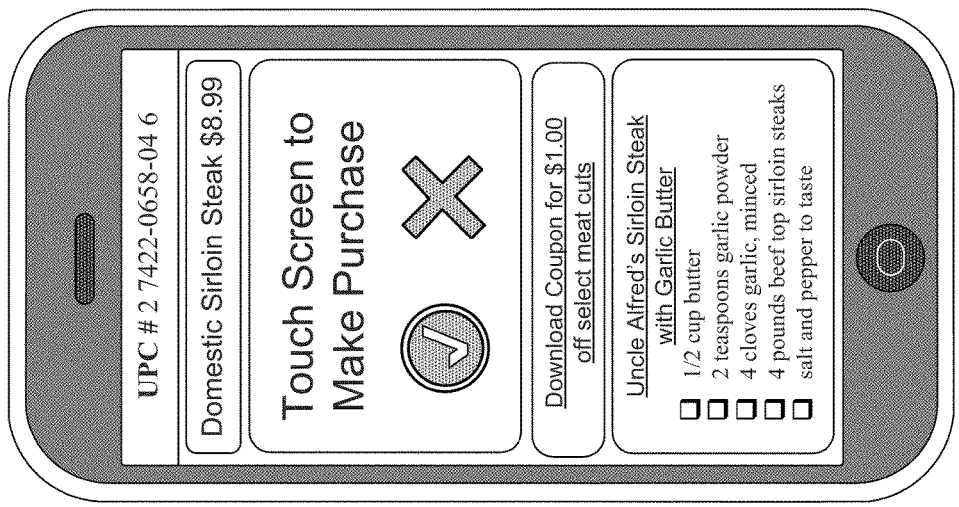
FIGS. 4A-4C are illustrative screen shots of a mobile device which provides information to assist the user in making a purchase decision, according to one embodiment of principles described herein.
Figure 4B:
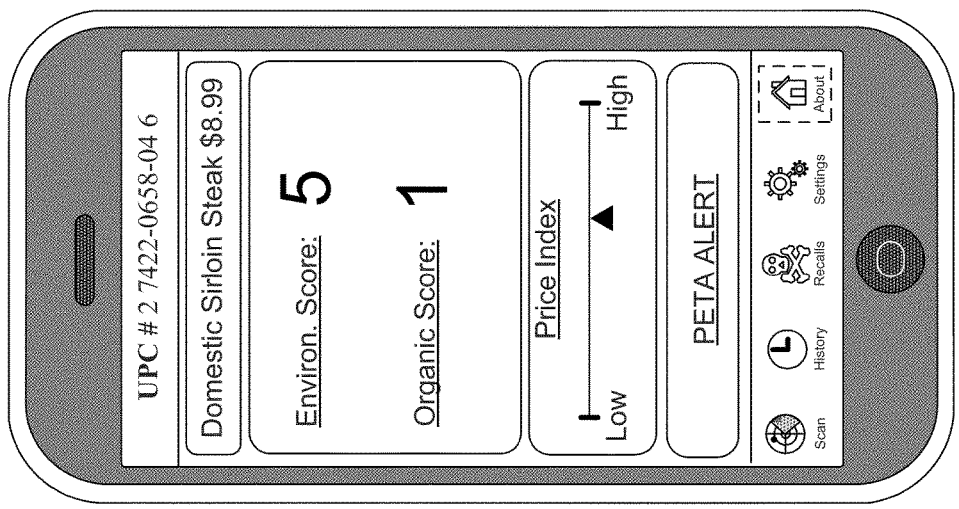
Figure 4A:
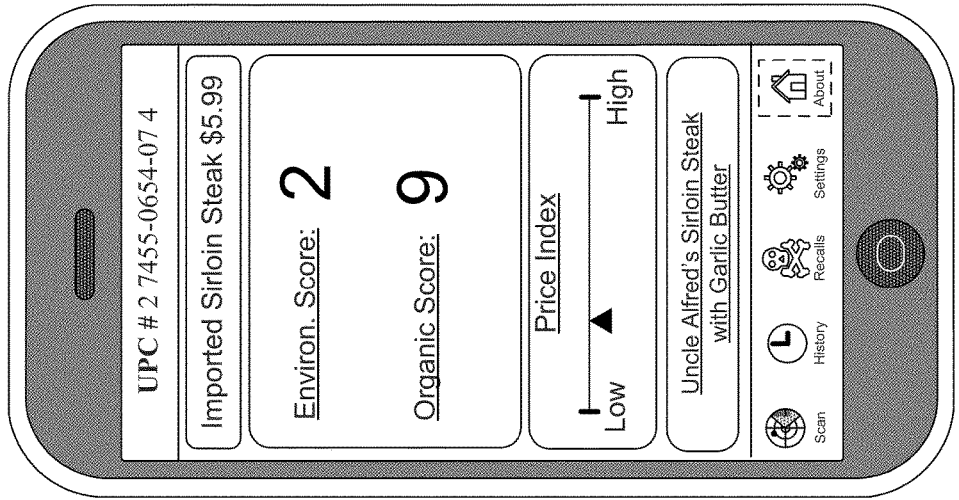

FIGS. 4A-4C are illustrative screen shots of a consumer using the "about" function of the application in another setting. In this example, the user would like to purchase sirloin steak and is using the application to inform the purchasing decision. The user has scanned a barcode from a first meat package at a retail location. The uppermost box in the view displays the scanned barcode number. The next box gives the name of the item and the price of the item. In this example, the name of the item is "Imported Sirloin Steak" and the price is $5.99 per pound.

The application next displays an "environmental score" and an "organic score" for the product. These scores are the result of analysis of data contained in the product record obtained from the traceability server (105, FIG. 2) and from other sources. In this example, the "Imported Sirloin Steak" has an environmental score of 2 and an organic score of 9. Lower scores designate less desirable attributes and higher scores indicate more desirable attributes. The environmental score is low because this meat was imported from Argentina. The large amount energy used in transporting the meat has resulted in the generation of 30 pounds of carbon dioxide per pound of meat, which is much higher than locally grown meat. The organic score is high because the cattle were raised on the open range in Argentina.

The next box shows a price index of this particular package of meat. A triangle shows the relative price of this meat when compared to comparable products which are available to the user. The range of prices is illustrated with the higher prices to the right and the lower prices to the left. The price index reports that this particular product is in the lower price range for comparable products.

In the bottom box, a hyperlink is given for a recipe which uses sirloin steak. This hyperlink is created by accessing the user's social network and retrieving the relevant information. The user can then click on the link to display the recipe, ingredients, and add them to a shopping list. The user may also be supplied with the location and cost of the additional ingredients.

FIG. 4B shows an illustrative screen shot which is generated when the user scans a second package of meat. The meat is identified as "Domestic Sirloin Steak" and has a price of $8.99 per pound. This product has an environmental score of 5 and an organic score of 1. The meat has been locally raised, which results in a more energy efficient product. The smaller transportation costs are somewhat offset by the chemical fertilizer which was used to produce the genetically modified grain the beef cattle were fed, resulting 14.8 pounds of carbon dioxide being generated per pound of beef. These details are available to the user and can be accessed by selecting the "Environ. Score" text.

The organic score is very low because the beef cattle were raised on a feed lot using genetically modified grains which were grown using artificial fertilizer and pesticides. The supply chain also indicates that the cattle were fed various growth hormones and antibiotics. These details are also available to the user and can be accessed by selecting the "Organic Score" text.

The price index for this product shows that the price per pound in the upper half of comparable products available to the user. Below the price index, an alert from animal rights organization is displayed. This indicates that the animal rights organization believes the animals used to produce the meat were mistreated in some way. The "PETA ALERT" text can be selected to take the user to more information provided by the animal rights organization or commentary on the alert by a social network.

FIG. 4C is a purchase screen which allows the user to purchase the product directly from their mobile device. This eliminates the need for the user to stand in a checkout line, wait for a cashier to enter the item and make a separate payment. Instead, the user simply needs to touch the screen to make or cancel the purchase. The application has also determined that there is a manufacturer coupon which is available for download which will reduce the price per pound of this particular product by $1.00. In some embodiments, these coupons can be generated in real time based on the user's query to the traceability server, purchasing history, and other factors.

The user has selected the recipe link shown in FIG. 4A and the complete ingredient list for "Uncle Alfred's Sirloin Steak with Garlic Butter" is shown in FIG. 4C. The user can then add the individual ingredients to their shopping list. The application may notify the user of the available products and price when the ingredients are selected.

Figures 5A, 5B, 5C:
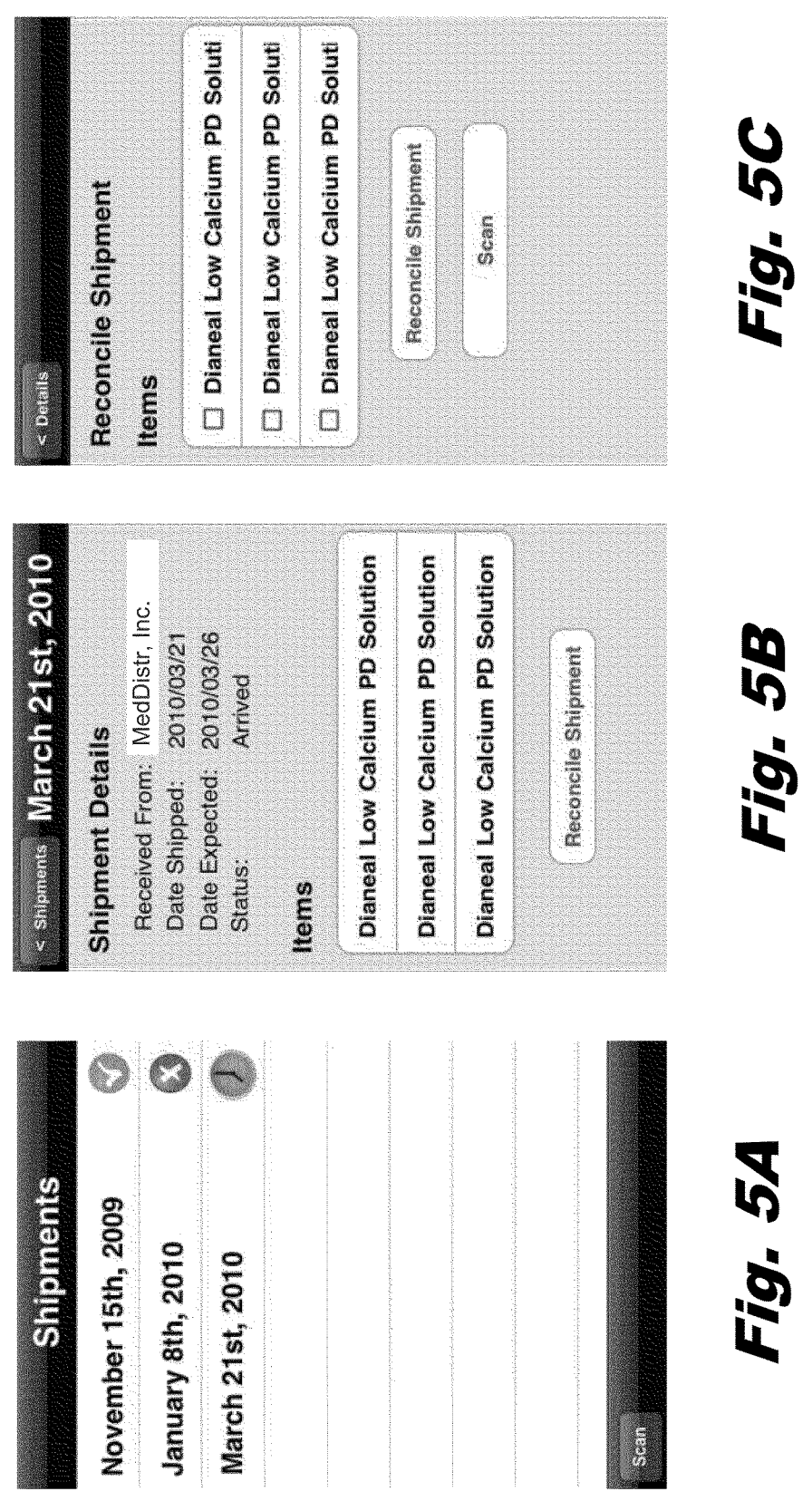

Mobile devices can also be used at other stages in the supply chain. For example, mobile devices can be used to verify and report shipments of various products at any point within the supply chain. FIGS. 5A-5C are illustrative screen shots of a mobile device which is configured to verify a shipment. In FIG. 5A, a list of shipments is shown. Indicators to the right of each shipment date show status of the various shipments. A shipment was received on Nov. 15, 2009. A shipment expected on Jan. 8, 2010 but was not received. A shipment is pending for Mar. 21, 2010. The user selects the shipment which is pending for March 21$^{st}$ and is taken a second screen shown in FIG. 5B.

FIG. 5B shows that the expected shipment of March 21$^{st}$ includes three identical items described as "Dianeal Low Calcium PD Solution" from "MedDistr, Inc." The status of the shipment is listed as "arrived." The user is now responsible for verifying the shipment. The user selects the "Reconcile Shipment" button at the bottom of the screen. This takes the user to the screen shown in FIG. 5C.

Figure 5F:
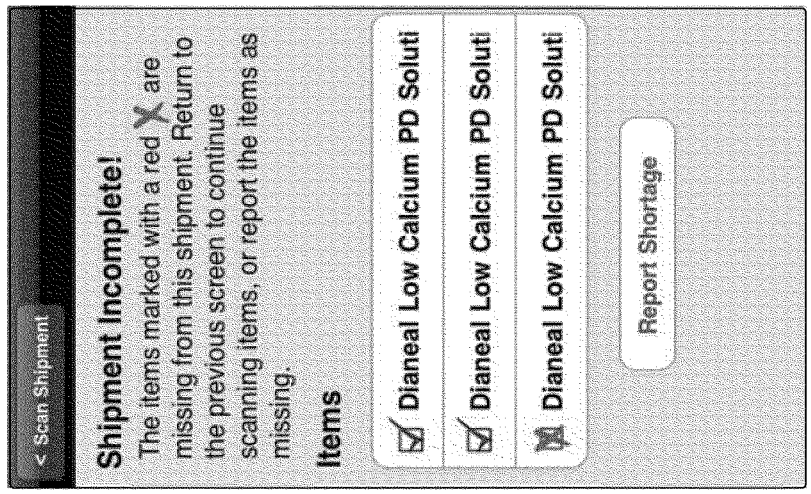
Figure 5E:
Figure 5D:
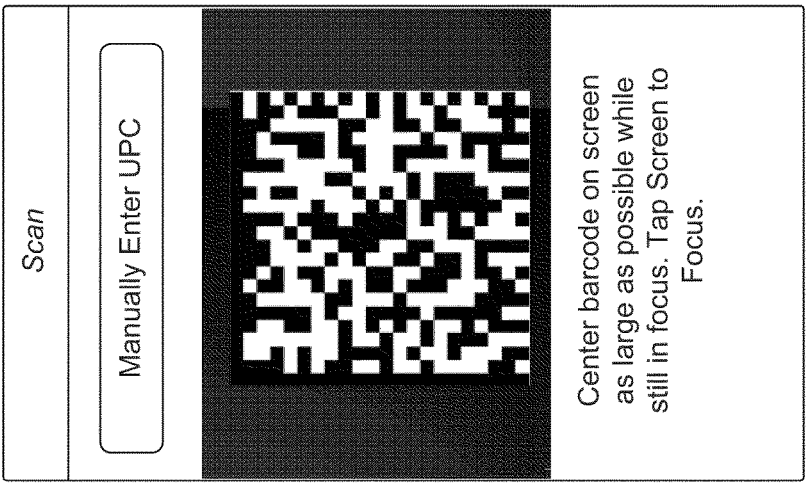

FIG. 5C shows a screen which lists the various products expected in the shipment and allows the user to scan the individual products. As shown in FIG. 5D, the user scans the two dimensional barcode. This triggers the checking off of the products listed in the shipment as shown in FIG. 5E. However, only two of the three expect products arrived in the shipment. FIG. 5F shows that the application recognizes that the shipment is incomplete and provides a method for reporting the shortage. According to one illustrative embodiment, this shortage is reported to the traceability server. The supplier of the product is then alerted that an error occurred and can act to correct it.

Figure 6:
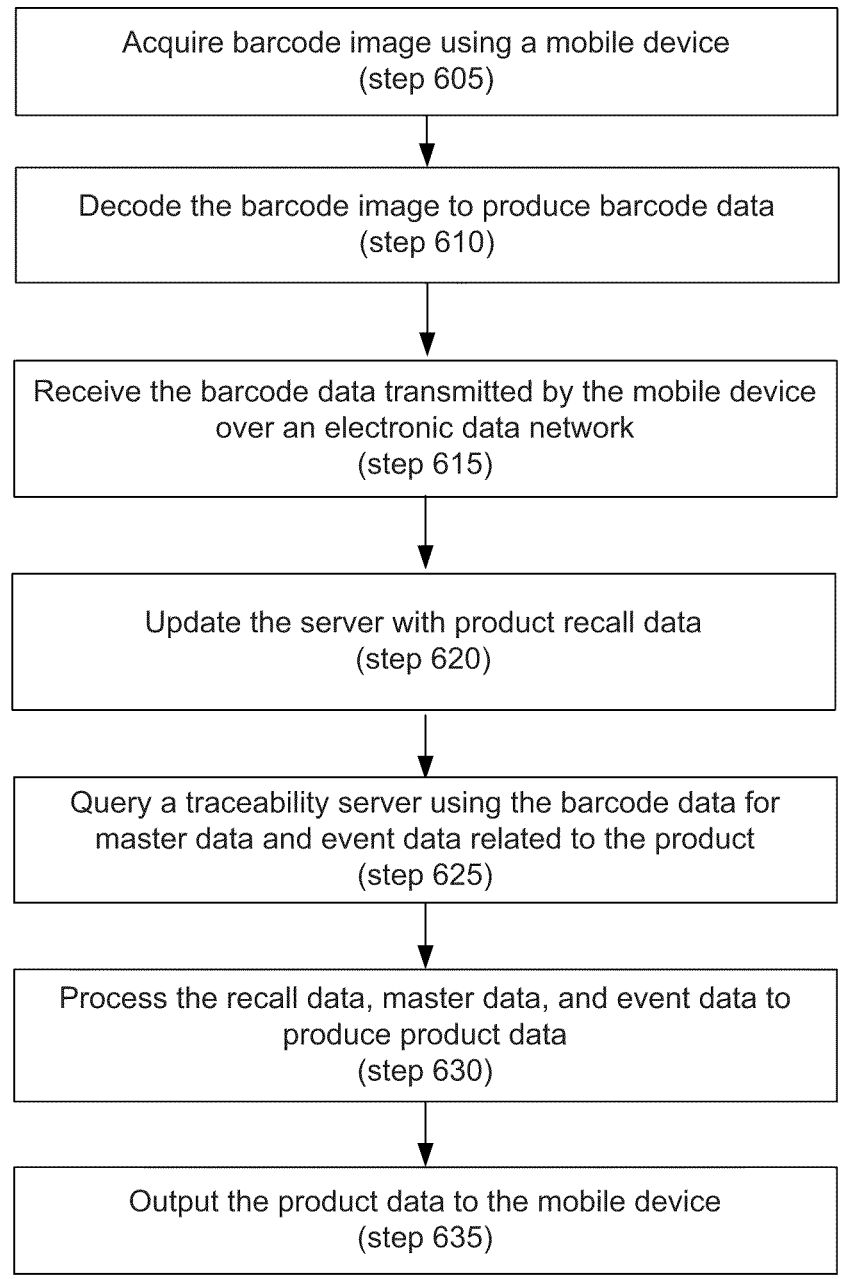
FIG. 6 is a flow chart of an illustrative method for supply chain management using mobile devices, according to one embodiment of principles described herein.

FIG. 6 is a flow chart of an illustrative method for supply chain management using mobile devices. In a first step, the barcode image or other product identifying information is acquired using the mobile device (step 605). According to one embodiment, the mobile device includes a color camera which is used to take one or more photographs of the barcode. As discussed above, the noise in the barcode image may be reduced by reducing the weighting of at least one color channel of the barcode image.

The barcode image is decoded to produce barcode data (step 610). The barcode data may be a unique serialized number which identifies an individual end user product or may be a more generalized identifier such as lot number or product type.

An external server receives the barcode data from the mobile device over an electronic data network (step 615). Typically, the electronic data, network includes a wireless network which the mobile device is configured to access. The external server can take a variety of forms, including a web server. The external server is updated with recall data issued by oversight organizations (step 620). According to one illustrative embodiment, the external server is updated using cron jobs which periodically retrieve FDA and USDA textual recall information. The textual recall information is parsed to extract recall data, which is then stored in the external server.

A traceability server is also queried by the external server using the barcode data for master data and event data related to the product (step 625). As discussed above, the master data is related to people, places, and products, and event data is related to actions such as shipping, mixing, joining, and refrigerating.

The recall data, master data, and event data are processed to produce product data (step 630). This product data is then output to the mobile device (step 635). In some embodiments, the server receives product identifying information from the mobile device and retrieves master data and event data using product identifying information from the traceability server and outputs the recall information, master data and event data directly to the mobile device. The mobile device then performs processing steps to provide the user with the desired product data.

The product data may include recall information, identify mislabeled products, expired products, allergy alerts, competitor products with pricing and location information, social networking data which gives contextual information, and other information. For example, the barcode data can be checked against the textual recall information stored in the external database. If the barcode data matches a recalled product the user can be notified that the product has been recalled. The product data or product identifying information may also be used to access other databases, websites, or servers.

In some examples, the location where the product barcode is acquired is recorded. For example, a GPS location could be recorded each time the mobile device is used to acquire and decode a barcode. This location information could be compared to shipping records in the traceability data to determine if the product is in an expected location. This would provide an effective method for the identification of bootlegged or counterfeit products. Where the products are marked individually with a serialized barcode, the barcode and scanning location can be verified against a manufacturer barcode database or the traceability server to ensure that the serialized barcode is correct, has only been used once, and that the product is in the expected location. If the serialized barcode has been used more than once, it could be an indication of counterfeit products or manufacturing error. In either case, the user would be alerted to the irregularity. Where two products were purchased which have the same individualize serial number, both purchasers can be alerted of the possibility that one of the products is potentially a counterfeit product.

The user may customize filters to screen the product data. The filters are applied to the product data so that the product data is displayed on the mobile device according to user preferences. For example, if the user only has an allergy to eggs, the user may not want to receive allergy alerts related to tree nuts. The user may wish the external server to access and search a social networking site or group for information related to a product or recall. For example, a Facebook group may be focused on chemical interactions in food products. By setting the filter to search the Facebook group postings, the user may be alerted to a potential interaction of a preservative in the scanned product. This provides additional context for ingredient information retrieved from the traceability server.

In some embodiments, the product data can also be used to predict if the user will be able to consume the product before the expiration of the product. For example, if the user is purchasing a medical product with a fixed dosage rate (one pill per day) and an expiration date, the application can predict if the user will be able to consume the product at the fixed dosage rate before expiration of the product. In other embodiments, the application may access a history of user purchases to determine the consumption rate of a particular product. For example, the user may consume one gallon of milk per week. Based on this information, the application can predict if the user will be able to consume the purchased milk before its expiration.

In some embodiments, the master and event data can be analyzed to create a chain of custody of the product. This chain of custody can be displayed to verify authenticity of the product. In other examples, the master and event data can be analyzed to determine if the product is properly labeled "organic" and to assign the product an organic score. As discussed above, the organic score can be generated based on a number of organic criteria such as the use of genetically modified seeds/plants, insecticides, herbicides, chemical fertilizer, and other criteria. The product may also be assigned an environmental score based on the master and event data. The environmental score can be generated based on a number of criteria including the amount of destruction of habitats involved in the production of the product, the amount of carbon dioxide generated in the production and transportation of the product, crop diversity, product packaging, incorporation of threatened animal species in the product, conservation practices of entities in the chain of custody and other factors.

The system can also provide the user with more personalized information and analysis. As discussed above, the system can predict if the user will be able to finish a product before it expires. The system can also store a history of user purchases. This history can be used to provide a budget analysis and/or diet analysis specific to the user. Additionally, a price index can be displayed for a scanned product, where the price index compares the price of the product to other comparable products available to the user.

The system can also provide functions which are used to verify shipments of products. For example, the system may receive shipment information listing the number, type, and serial numbers of products in a shipment. The products received in the shipment are scanned using the mobile device. The application then reconciles the received products with the shipment information. Any shortages or other irregularities in the shipment are then identified and reported. The individual serialization for products and end-user scanning can help prevent false or innocently incorrect clams of a shipment being incomplete. For example, the shipping manifest may specify that three pallets of a product were sent, but the retailer only scans in two pallets and reports the last pallet as missing. Later, all pallets are then unloaded and eventually make it onto the shelves. In this retail environment, the end users begin scanning the products from the missing pallet. This is reported to the traceability server. This confirms that all three pallets were actually received by the retailer.

According to one illustrative embodiment, the barcode data may also be used to assist in recycling or disposing of the product. For example, the traceability data may be accessed to show the various materials the product is made from, how to separate the materials for recycling, the presence of toxic or hazardous materials, locations for recycling, and entities responsible for recycling the product. In some embodiments, the user may simply scan the barcode and indicate that the user no longer wants the product, the product is no longer functional, or the product has otherwise reached the end of its lifetime. This information is then transmitted to the entity responsible for recycling the product, which then arranges for the product to be picked up from the user. The product is then appropriately recycled or reused.

Additionally, the principles described above are not limited to implementation only in conjunction with mobile devices. For example, many of the principles could be implemented at a check-out register in a retail environment. For instance, the register could know, through the use of a loyalty card, that the user is allergic to fish. The register could query the traceability server and discover that the curry sauce the user is purchasing contains fish sauce. In another example, the register queries the traceability server and notices the product in question has been recalled. Further, the register could provide data related to the environmental cost of the users purchases. For example, the register could query the event data from the traceability server to determine how many miles the products purchased by the user were transported or how much equivalent carbon dioxide was generated by the production and transportation of the goods purchased. This information could be printed on a receipt given to the user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for supply chain management using mobile devices comprising:

receiving identifying information by a server from a mobile device via an electronic data network; the information identifying a product;

querying a traceability server via the network for recall data, master data and event data related to the product using the identifying information;

recording, on the server, a location at which the identifying information is acquired by the mobile device and comparing this location with shipping and location records in the master data event data to determine if the product is in an expected location;

processing the location, recall data, master data, and event data to produce product data; and outputting the product data to the mobile device;

in which the identifying information for a product comprises:

a color barcode image acquired using a color camera on the mobile device, in which a weighting of at least one color channel of the barcode is reduced to reduce noise in the color barcode image.

2. A system for supply chain management using mobile devices comprising:

a server configured to receive product identifying information from a mobile device and run crop jobs to periodically retrieve recall information from oversight agencies;

an electronic data network configured to connect a mobile device to the server; and a traceability server containing product records which comprise master data and event data for a product;

in which the server receives product identifying information from the mobile device, in which the product identifying information comprises a color barcode image acquired using a color camera on the mobile device, in which a weighting of at least one color channel of the color barcode image is reduced to reduce noise in the color barcode image, and retrieves master data and event data from the traceability server and outputs the recall information, master data and event data for the product to the mobile device.

* * * * *